United States Patent
Luce

(10) Patent No.: US 8,480,026 B2
(45) Date of Patent: Jul. 9, 2013

(54) SHIMMY DAMPER FOR AIRCRAFT LANDING GEAR

(75) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 981 days.

(21) Appl. No.: 12/398,706

(22) Filed: Mar. 5, 2009

(65) Prior Publication Data
US 2009/0224100 A1 Sep. 10, 2009

Related U.S. Application Data

(60) Provisional application No. 61/033,837, filed on Mar. 5, 2008.

(51) Int. Cl.
*B64C 25/58* (2006.01)
(52) U.S. Cl.
USPC ....................................... 244/104 R
(58) Field of Classification Search
USPC .......... 452/50, 51, 100 R, 101, 102 R, 102 A,
452/102 SL, 102 SS, 104 R; 188/381, 322.17;
267/134, 136, 140.11
See application file for complete search history.

(56) References Cited

U.S. PATENT DOCUMENTS

| | | | |
|---|---|---|---|
| 2,661,917 A | 12/1953 | O'Connor et al. | |
| 2,830,562 A | 4/1958 | Hogan | |
| 3,430,896 A | 3/1969 | Labrecque | |
| 6,290,038 B1 | 9/2001 | Jensen et al. | |
| 7,571,876 B2 * | 8/2009 | Bachmeyer et al. | 244/100 R |
| 7,578,467 B2 * | 8/2009 | Goodrich | 244/110 C |
| 8,020,648 B2 * | 9/2011 | Otto | 180/6.48 |

FOREIGN PATENT DOCUMENTS

| | | | |
|---|---|---|---|
| GB | 671304 A | 4/1952 | |
| GB | 1215552 A | 12/1970 | |

\* cited by examiner

*Primary Examiner* — Richard Price, Jr.
(74) *Attorney, Agent, or Firm* — Edwards Wildman Palmer LLP; Scott D. Wofsy; Joshua L. Jones

(57) ABSTRACT

A non-hydraulic shimmy damper that can be mounted to existing aircraft landing gear and does not substantially interfere with steering or require significant maintenance. When the shimmy damper requires maintenance it can be readily swapped out as a line-replaceable unit (LRU) thereby reducing aircraft downtime. The shimmy damper is mountable to an aircraft landing gear strut and includes a rotatable coupling member that engages a rotatable steering member of the landing gear strut. A damping assembly is coupled to the rotatable coupling member to provide a damping force. The damping assembly is adjustable so that a desired amount of damping force can be applied and/or maintained.

7 Claims, 4 Drawing Sheets

SHIMMY DAMPER FOR AIRCRAFT LANDING GEAR

PRIORITY CLAIM

This application claims priority to provisional patent application No. 61/033,837 filed on Mar. 5, 2008 and is incorporated herein by reference.

FIELD OF THE INVENTION

The present invention relates generally to landing gear for aircraft. More particularly, the invention relates to a shimmy damper for aircraft landing gear.

BACKGROUND OF THE INVENTION

Wheel shimmy is a condition in which the landing gear wheel or wheels oscillate from side to side along a straight line parallel to the direction of travel of the aircraft. Wheel shimmy can be caused by a number of conditions such as low torsional stiffness, excessive freeplay in the landing gear, wheel imbalance, or worn parts. Often, however, wheel shimmy occurs even in new aircraft due to resonance between the landing gear and the airframe of the aircraft. This resonance may not be discovered until after a new aircraft is first flown and the design of the landing gear and airframe is well established. Solving a shimmy problem after an aircraft is built presents challenges because it is not usually economical to redesign and replace the landing gear in order to solve the problem. Accordingly, several different concepts have been developed for reducing or eliminating wheel shimmy in existing landing gear.

For example, hydraulic shimmy dampers have been used to damp wheel shimmy. Typically, such shimmy dampers consist of a hydraulic shock absorber mounted between components of the landing gear to damp shimmy motions. The hydraulic shock absorber generally consists of a hollow tube filled with oil. A rod and piston move through the fluid to generate velocity-dependent, viscous-damping forces. Such designs require frequent maintenance, and temperature increases can reduce damping efficiency. Further, such shimmy dampers generally do not permit 360 degree rotation of the wheel or wheels and typically are difficult to adjust to provide different levels of damping.

Another type of shimmy damper that has been used in the past is a friction-type shimmy damper that mechanically engages a steering collar gear on a landing gear strut. For example, one design includes a belleville spring washer compressed against the steering collar to damp rotation thereof. While such a shimmy damper may be functionally adequate, it is not readily retrofittable to existing landing gear assemblies and installation and/or removal of the belleville spring washers typically requires the landing gear to be substantial disassembled, as many of these types of dampers require the spring washers to be telescoped over the landing gear strut.

Hydraulic damping (by addition of a restrictor) is also used as a feature of the many hydraulic steering actuation systems as a method to attenuate shimmy vibration. This method is popular as it adds the least additional weight and is generally effective. In cases where the hydraulic restrictor is not effective due to distance from the vibration source or flexibility of the structural load paths from the actuation system to the vibration, other methods may be required.

SUMMARY OF THE INVENTION

The present invention provides a non-hydraulic rotary shimmy damper that can be mounted to existing aircraft landing gear and does not substantially interfere with steering or require significant maintenance. When the shimmy damper requires maintenance it can be readily swapped out as a line-replaceable unit (LRU) thereby reducing aircraft downtime. The shimmy damper is adjustable to provide a desired amount of damping for a given application and to permit readjustment of the shimmy damper to account for changes in the aircraft landing gear due to worn parts, wheel imbalance, etc.

Accordingly, the present invention provides an aircraft shimmy damper mountable to an aircraft landing gear strut having a steerable member for steering a wheel carried by the landing gear comprising a rotatable coupling member and a damping assembly operatively coupled to the rotatable coupling member for resisting rotation of the rotatable coupling member. The rotatable coupling member is configured to be rotatingly connected to the steerable member such that rotation of the rotatable coupling member rotates the steering member.

More particularly, the shimmy damper includes a biasing mechanism for biasing the damping gear into engagement with a steering gear of the landing gear strut. The damping assembly includes a rotation member and at least one friction member, such as a friction pad, biased against the rotation member to resist rotation of the rotation member. The biasing mechanism is adjustable for controlling the bias applied to the rotation member.

In accordance with another aspect of the invention, a shimmy damper mountable to an aircraft landing gear having a rotatable steering member for steering a wheel carried by the landing gear comprises a rotation member configured to engage the steering member such that rotation of the rotation member rotates the steering member, and a friction member frictionally engaged with the rotation member to resist rotation of the rotation member.

More particularly, an adjustable biasing mechanism for biasing the rotation member against the steering member is provided. In addition, an adjustable biasing member for biasing the friction member against the rotation member is provided and, in an exemplary embodiment, includes a spring washer preloaded against the friction member.

In accordance with another aspect of the invention, a method of damping shimmy in an aircraft landing gear is provided comprising biasing a rotatable coupling member against a rotatable steering member of the aircraft landing gear and resisting movement of the rotatable coupling member with a damping assembly.

Further features of the invention will become apparent from the following detailed description when considered in conjunction with the drawings.

DETAILED DESCRIPTION OF THE PREFERRED EMBODIMENT

Figure 1:
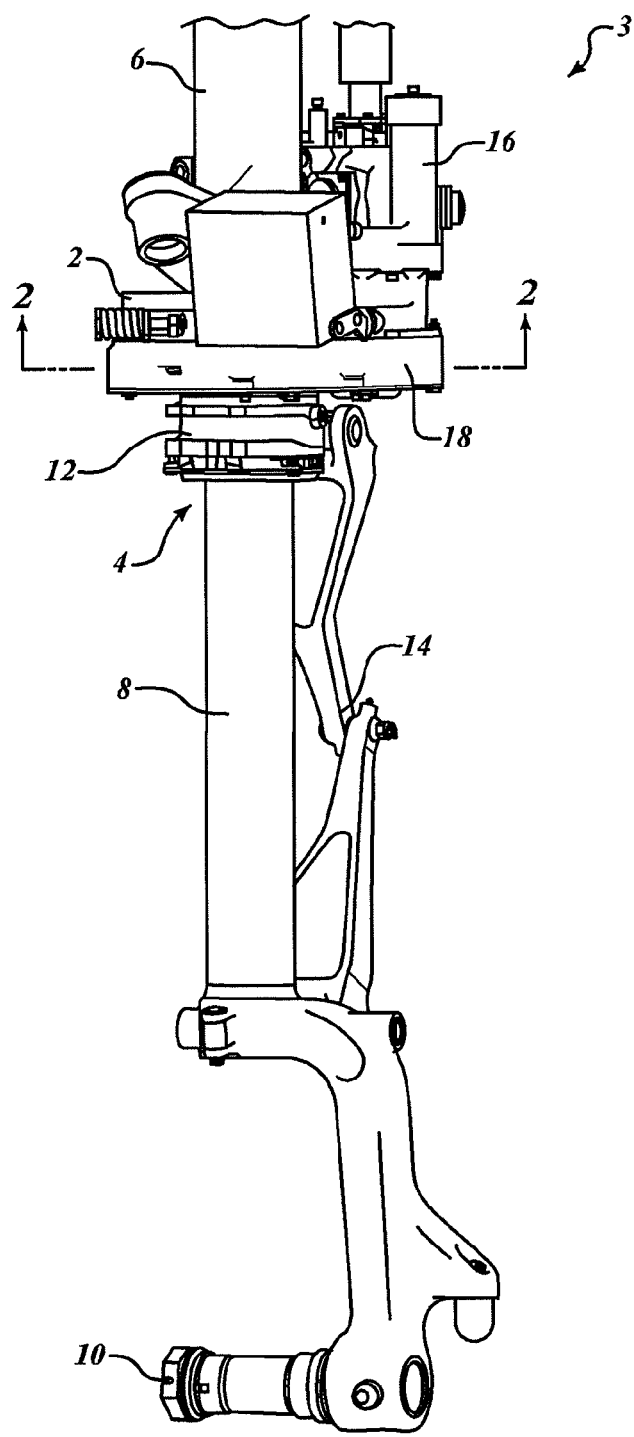
FIG. 1 is an elevational view of an aircraft landing gear including a shimmy damper in accordance with an embodiment of the present invention.
Figure 2:
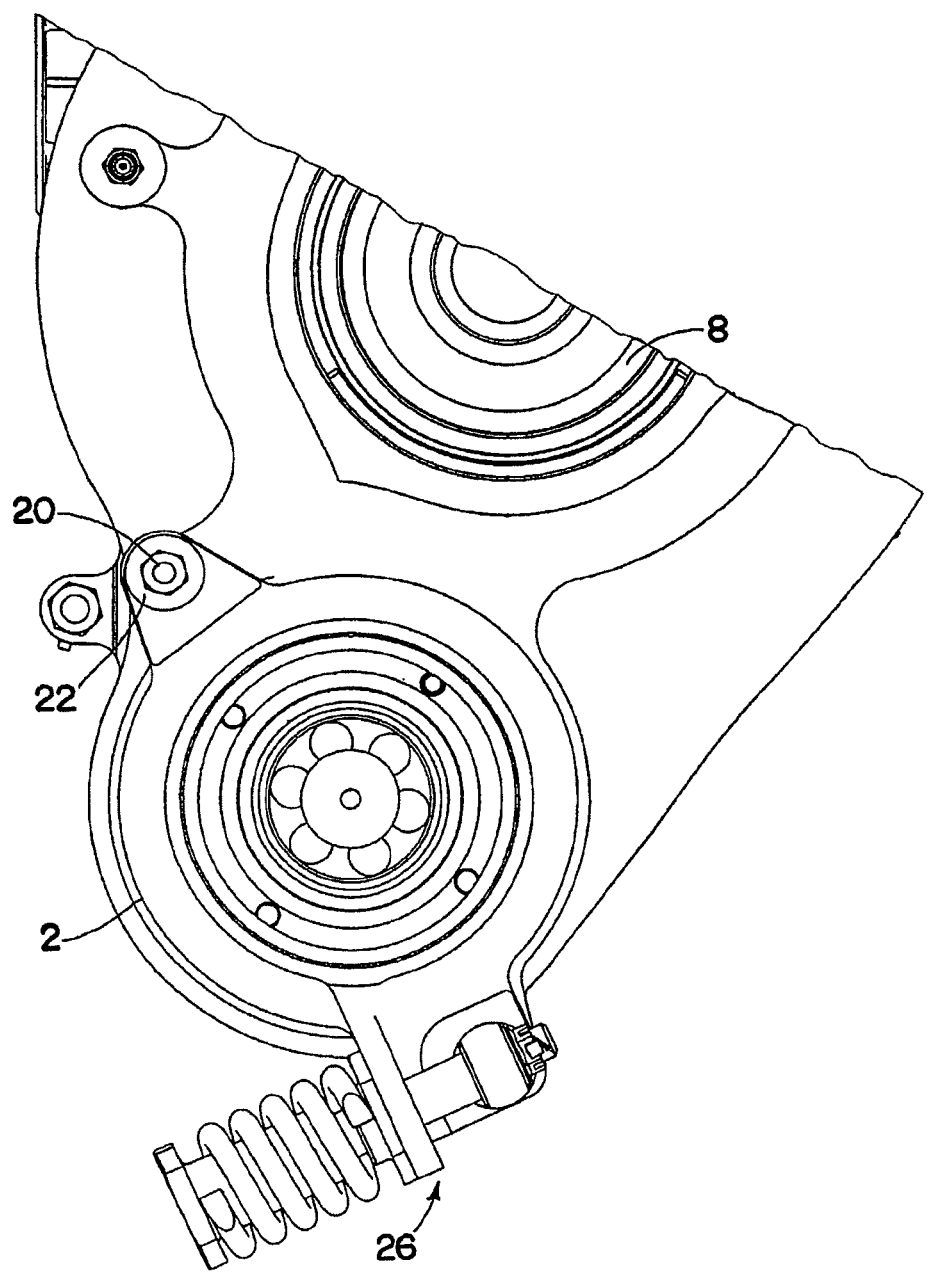
FIG. 2 is a partial cross-sectional view taken through the line 2-2 of FIG. 1.

Referring now to the drawings in detail, and initially to FIG. 1 and 2, an exemplary shimmy damper 2 in accordance with the present invention is illustrated installed on an exemplary landing gear 3. The simplified aircraft landing gear 3 includes a strut 4 having an upper tube 6 that is mounted at an upper end to an aircraft structure (not shown). A lower tube 8 extends from the upper tube 6 and includes a hub 10 mounted thereto to which a wheel assembly (not shown) can be attached. A rotatable steering collar 12, which can include a collar gear, is mounted to the lower end of the upper tube 6 and is rotatably connected to the hub 10 via torque arm 14 for transmitting steering inputs thereto. A steering motor 16 which typically includes a pinion gear is mounted to the upper tube 6 using a suitable method (not shown and not important to the invention) and a gear cover 18 that encloses the collar and pinion gear providing a lubrication chamber that is sealed from the environment. The aircraft landing gear 3 is shown in simple or outline form, while other structures such as locking mechanisms, retracting mechanisms, and steering mechanisms are not shown in order to avoid obscuring the shimmy damper 2. Various arrangements of such structures are known in the art and are not critical to the description or understanding of the invention. Further, the shimmy damper 2 can be mounted to an aircraft landing gear in a wide variety of positions and locations other than as shown.

In FIG. 2, the shimmy damper 2 is mounted for pivotal movement by a pivot connection, which in the illustrated embodiment is a mount bolt 20 and pivot bushing 22 that is received in a counterbore 24 (see FIG. 3) in the gear cover 18. Accordingly, the shimmy damper 2 is free to slide across the top surface of the gear cover 18. As will be described in more detail below, a biasing mechanism 26 is secured to the gear cover 18 so as to bias the shimmy damper 2 into engagement with the steering collar 12.

Figure 3:
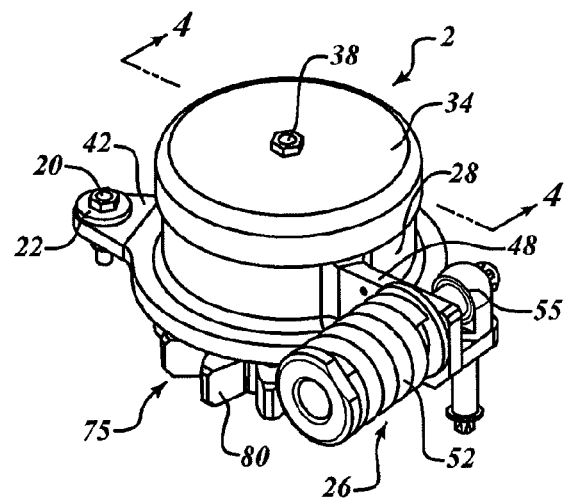
FIG. 3 is a perspective view of a shimmy damper in accordance with an embodiment of the present invention.
Figure 4:
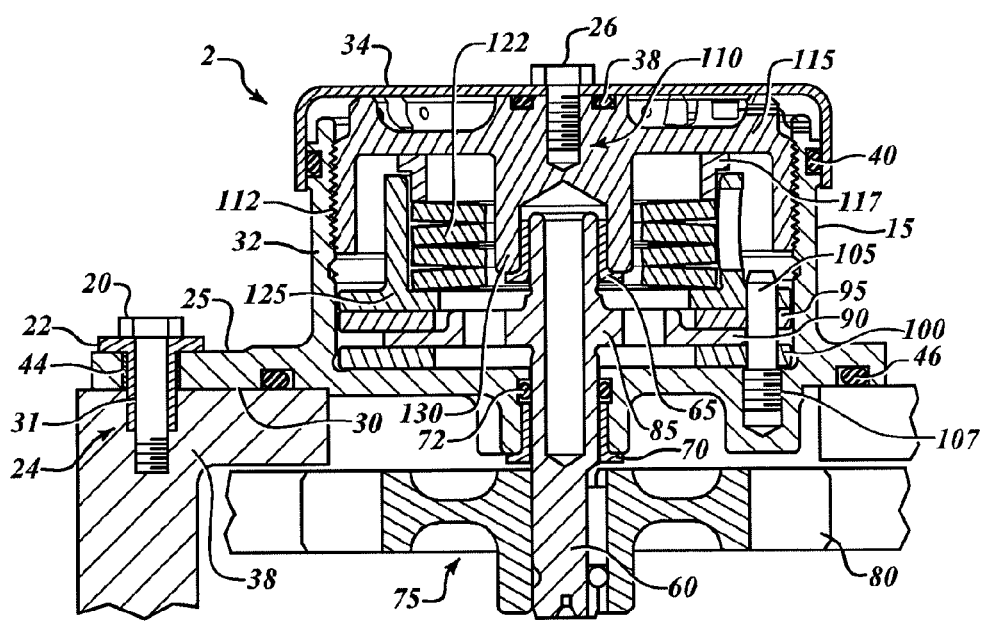
FIG. 4 is a cross-sectional view taken through line 4-4 of FIG. 3.

Turning to FIGS. 3 and 4, the shimmy damper 2 will be described in detail. The shimmy damper 2 includes a housing 28 having a bottom 30 and a generally cylindrical side wall 32, which together form an interior cavity. A cover 34 for enclosing the interior cavity is secured with a bolt 36, and suitable sealing members, such as O-rings 38 and 40, are provided for sealing the cover 34 to prevent exposure of the interior of the housing 28 to the elements.

The housing 28 includes a flat radially extending projection 42 including a mounting hole 44 through which the mount bolt 20 and pivot bushing 22 extend for pivotally securing the shimmy damper 2 to gear cover 18 of the aircraft landing gear 4. A sealing member, such as O-ring 46, is provided for sealing the housing 28 to the gear cover 18.

The housing 28 also includes a radially extending projection 48 to which the biasing mechanism 26 is mounted. The biasing mechanism 26 includes a spring 52 and spring retainer and adjustment mechanism 55. The spring retainer and adjustment mechanism 55 is secured to the gear cover 18 and is configured to compress the spring 52 against the projection 48 for applying a force thereto. Accordingly, when the shimmy damper 2 is mounted to the landing gear strut 4, the biasing mechanism 26 can be used to bias the shimmy damper 2 into engagement with the gear on the rotatable steering collar 12 of the landing gear strut 4.

Biasing the shimmy damper 2 against the rotatable steering collar generally reduces freeplay therebetween, and can function to maintain a proper amount of gear lash so as to facilitate smooth operation of the shimmy damper 2. It will be appreciated that freeplay between the shimmy damper 2 and the rotatable steering member 12 generally has the effect of allowing the rotatable steering collar 12 to rotate with little or no influence from the shimmy damper 2 throughout the range of freeplay. Accordingly, if excessive freeplay exists, a shimmy can develop in the landing gear 4 despite the presence of the shimmy damper 2. Therefore, minimizing freeplay between the gears is generally desirable. Although in the illustrated embodiment the biasing mechanism 26 is provided to control the freeplay between the shimmy damper 2 and the rotatable steering collar 12, it will also be understood that freeplay between the components can be reduced or eliminated in other ways, and the invention is not limited to the use of the biasing mechanism 26 as illustrated.

A shaft 60 extends from the housing 28 through a centrally located opening therein. The shaft 60 is supported for rotation in the cavity of the housing 28 by suitable means, such as upper bushing 65 and lower bushing 70. A shaft seal 72 is provided for sealing the shaft 60 to the opening in the housing 28. A rotatable coupling member, such as engagement gear 75, is secured to the shaft 60 for rotation therewith. The engagement gear 75 has a plurality of teeth 80 for engaging mating teeth of a steering gear of an aircraft landing gear strut, as will be described. Within the housing 28 a rotation member, disk member 85, extends radially from the shaft 60.

Disk member 85 is supported for rotation on shaft 60. It will be appreciated that disk member 85 can be a separate member secured to the shaft 60 by suitable means, such as a key. Alternatively, the disk member 85 can be formed integrally with the shaft 60, as shown. A radially outer portion of the disk member 85 defines a generally flat engagement area 90 against which a pair of friction pads 95 and 100 are configured to press on opposite surfaces thereof. The friction pads 95 and 100 are fixed against rotation within the housing 28 via suitable means, such as one or more mounting pins 105 press fit in bores 107 in the housing 28. An adjustable cap assembly 110 for preloading the friction pads 95 and 100 against the disk member 85 is threaded into the housing 28 via threads 112.

The adjustable cap assembly 110 includes a cap 115, a compression ring 117, a stack of annular spring disks 122, which may be belleville spring washers, and a spring disk guide 125. A spring disk spindle 130 extending from the cap 112 extends through the center of each spring disk 122, and retains the upper bushing 65 for supporting the shaft 60. Each spring disk 122 contacts the spring disk below at an inner edge or outer edge as shown. Although four spring disks 122 are illustrated, any suitable number can be used depending on the application and the magnitude of preload pressure required. The bottom spring disk 122 contacts the spring disk guide 125. The spring disk guide 125 contacts the upper friction pad 95 and applies a preload pressure thereto. The friction between the upper friction pad 95, lower friction pad 100, and the disk member 85 produced by the pressure applied by the adjustable cap assembly 110 opposes rotation of the disk member 85.

To adjust the preload pressure on the disk member 85, the cap 115 is rotated clockwise or counterclockwise (e.g., screwed into or out of the housing 28) to adjust the compression of the spring disks 122. It will be appreciated that rotation of the cap 115 results in a linear translation of the cap 115 so as to force the compression ring 117 downward thereby compressing the stack of spring disks 122. As the spring disks 122 are compressed, they in turn act on the spring disk guide 125 thereby pressing the upper friction pad 95 into engagement with the upper surface of the engagement area 90 of disk member 85. The shaft 60, being supported in the housing 28 such that it can shift axially, can shift downward in response to the pressure applied by the upper friction pad 95 while the lower friction pad 100 applies a reactionary force to the lower surface of engagement area 90 of the disk member 85.

It will now be appreciated that the frictional forces between the friction members 95 and 100 and the disk member 85 developed by the damping assembly convert rotational energy into primarily thermal energy for dissipation to the environment. Accordingly, rotation of the shaft 60 and engagement gear 75, and any other member operatively connected to the engagement gear 75, can be dampened a desired amount by adjusting the preload pressure of the shimmy damper 2.

It will now also be appreciated the shimmy damper 2 applies a generally constant force that opposes rotation of the rotatable steering member 12 and, consequently, a wheel mounted to hub 10. As previously described, the magnitude of the opposing force can be adjusted with the adjustable cap assembly 110 to control the amount of preload pressure the friction members 95 and 100 apply to the disk member 85. Further, as components of the aircraft landing gear 4 or the friction pads and/or disk member 85 of the shimmy damper 2 wear and/or fatigue through operation, the shimmy damper 2 can be re-adjusted to provide suitable damping to prevent shimmying of the aircraft landing gear.

Figure 5:
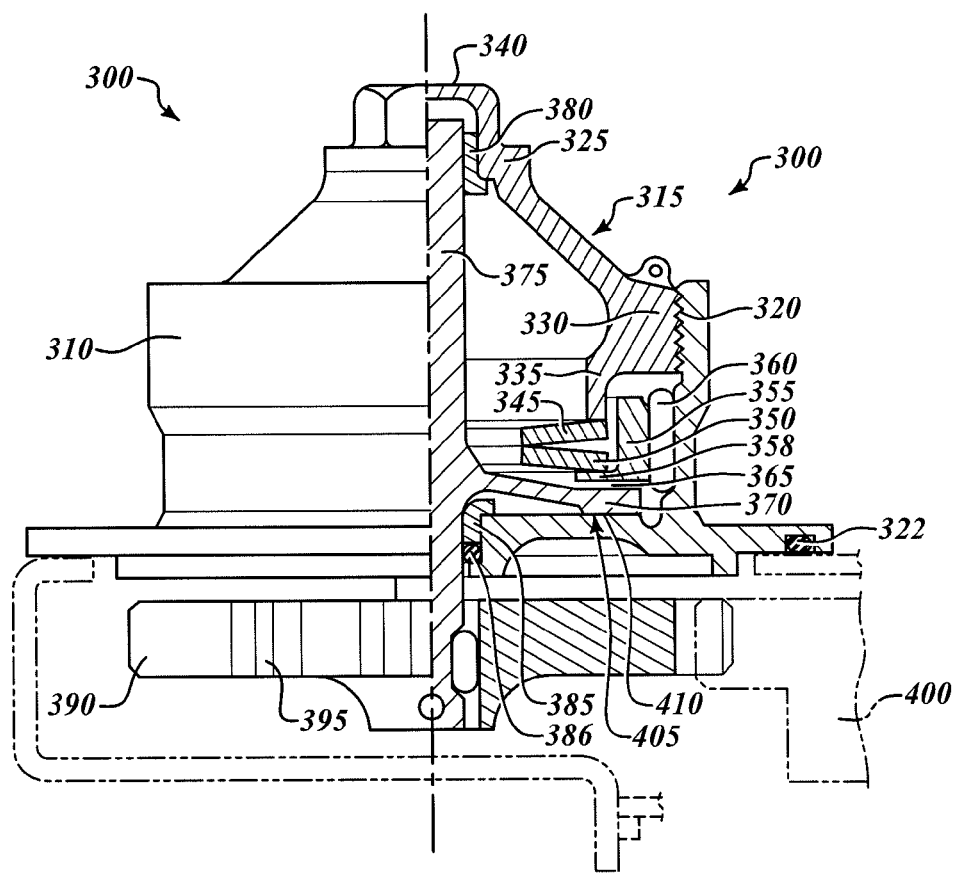
FIG. 5 is a partial cross-sectional view of another shimmy damper in accordance with an embodiment of the present invention.

Turning now to FIG. 5, another embodiment in accordance with the present invention will be described. In this embodiment, the shimmy damper 300 includes a generally cylindrical housing 310 into which a cap assembly 315 is screwed via threads 320. Although not illustrated in FIG. 5, the housing 310 can include one or more mount holes for securing the shimmy damper 300 to a gear cover, and may also include a biasing mechanism for biasing the shimmy damper 300 against a rotatable steering member, as previously described. The housing 310 includes a sealing member 322 for sealing the bottom of the housing 310 to a gear cover.

The cap assembly 315 in this embodiment includes a cap 325 having a threaded portion 330 for mating with threads 320 on the housing 310, a compression ring portion 335, and an upper portion 340 configured to permit the cap assembly 315 to be screwed into the housing 310. The upper portion 340 also functions as a cover to enclose the interior of the housing 310. In the illustrated embodiment, the upper portion 340 includes a hex head for engagement with a suitable tool, such as a wrench, for rotating the cap assembly 315. Other means for turning the cap assembly 315 can be provided. For example, the upper portion 340 could be provided with a slot for receiving a blade of a screw driver. Alternatively, a hollow open end cylinder could be mounted to the upper portion 340 into which a shaft could be inserted to turn the cap assembly 315.

The cap assembly 315 further includes a pair of spring disks 345 and 350, which may be belleville spring washers, and a spring disk guide 355. The spring disk guide 355 has a lip 358 upon which the lower spring disk 350 rests. The spring disk guide 355 is fixed relative to the housing 310 by one or more pins 360 and includes an upper friction pad 365 for engaging a disk member 370 on shaft 375.

Shaft 375 extends from the housing 310 through a centrally located opening in the housing 310. The shaft 375 is supported for rotation in the housing 310 by suitable means, such as upper bushing 380 which is retained in the cap assembly 315, and lower bushing 385. A shaft seal 386 is provided for sealing the shaft 375 to the opening in the housing 310. A rotatable coupling member, such as engagement gear 390, is secured to the shaft 375 for rotation therewith. The engagement gear 390 has a plurality of teeth 395 for engaging mating teeth of a steering gear 400 of an aircraft landing gear strut.

Disk member 370 is supported for rotation with shaft 375. As mentioned, disk member 370 can be a separate member secured to the shaft 375 by suitable means such as a key, or can be formed as a portion of the shaft 375, as shown. A radially outer portion of the disk member 370 defines a generally flat engagement area 410 against which friction pad 365 is configured to engage.

Adjusting the shimmy damper 300 illustrated in FIG. 5 is similar to the manner in which the shimmy damper 2 of FIGS. 1-2 is adjusted. Accordingly, the amount of damping produced by the shimmy damper 300 can be adjusted by rotating the cap assembly 315 clockwise or counterclockwise to achieve a linear translation of the compression ring portion 335 thereof. As will be appreciated, as the cap assembly 315 is screwed into the housing 310, the compression ring portion 335 compresses the spring disks 345 and 350 thereby applying more pressure on the disk member 370 via the friction pad 365. Accordingly, a larger damping force is produced by the shimmy damper 300.

The shaft and/or disk members in the described embodiments can be made of any suitable material, such as steel. Depending on the particular application, one or more coatings can be applied to the disk member. For example, a preferred coating is tungsten carbide applied by a high velocity oxygen fueled technique (HVOF) to the upper and lower surfaces of the disk member. A preferred friction pad material for use in conjunction with a tungsten carbide coated disk member is ARLON 1286, a material manufactured by Greene Tweed. However, other materials can be used for the friction pads such as metallic, semi-metallic, or ceramic friction materials.

It will be appreciated that other engagement members and/or additional transmission elements can be used in accordance with the present invention. For example, a chain or belt could be provided for coupling the engagement gear with the steering collar gear. Similarly, a rack might be provided for linking the collar gear and the engagement gear.

It will now be appreciated that the present invention provides an adjustable rotary shimmy damper mountable to existing aircraft landing gear. The shimmy damper does not substantially interfere with steering or require significant maintenance. The shimmy damper is adjustable to provide a desired amount of damping for a given application and to permit readjustment of the shimmy damper to account for changes in the aircraft landing gear due to worn parts, wheel imbalance, and other causes of wheel shimmy throughout the service life of the aircraft.

Principles of the invention can be applied to other types of landing gear and struts, including landing gear utilizing hydraulic steering members.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The embodiments of the invention in which an exclusive property or privilege is claimed are defined as follows:

1. An aircraft shimmy damper mountable to an aircraft landing gear strut having a steerable member for steering a wheel carried by the landing gear, the damper comprising:
    a rotatable coupling member; and
    a damping assembly operatively coupled to the rotatable coupling member for resisting rotation of the rotatable coupling member, wherein the rotatable coupling member is configured to be rotatingly connected to the steerable member such that rotation of the rotatable coupling member rotates the steerable member, and wherein the damping assembly includes a rotation member and at least one friction member frictionally biased against the rotation member along a substantially flat engagement surface thereof to resist rotation of the rotation member.

2. A shimmy damper as set forth in claim 1, further comprising a biasing mechanism for biasing the rotatable coupling member into engagement with the steering member of the landing gear strut unless any freeplay of the rotatable coupling member can be tolerated.

3. A shimmy damper as set forth in claim 1 wherein the friction member is at least one friction pad.

4. A shimmy damper as set forth in claim 1, further comprising an adjustable biasing mechanism for controlling the bias applied to the rotation member.

5. A shimmy damper as set forth in claim 4, wherein the adjustable biasing mechanism is a spring washer preloaded against the friction member.

6. A shimmy damper as set forth in claim 1, wherein the rotatable coupling member is a base material that is one of surface hardened or hard coated, in order to resist wear or galling when in rotational contact with the damping assembly.

7. A shimmy damper as set forth in claim 1, wherein the friction member is made of a material that resists wear and galling when in rotational contact with the rotatable coupling member.

* * * * *